United States Patent [19]
Walther et al.

[11] 3,897,113

[45] *July 29, 1975

[54] RIM MOUNTING

[75] Inventors: William D. Walther, Kettering; Robert A. DeRegnaucourt, Centerville, both of Ohio

[73] Assignee: Dayton-Walther Corporation, Dayton, Ohio

[ * ] Notice: The portion of the term of this patent subsequent to Oct. 22, 1991, has been disclaimed.

[22] Filed: Dec. 10, 1973

[21] Appl. No.: 423,310

Related U.S. Application Data

[63] Continuation-in-part of Ser. No. 325,510, Jan. 22, 1973.

[52] U.S. Cl. ............ 301/13 SM; 85/1 R; 301/11 R; 301/12 R
[51] Int. Cl. ........................................... B60b 23/10
[58] Field of Search .... 301/10 R, 11 R, 12 R, 13 R, 301/13 SM, 19, 20, 36 R; 85/1 R

[56] References Cited
UNITED STATES PATENTS

| | | | |
|---|---|---|---|
| 2,819,118 | 1/1958 | Fahlman | 301/13 SM |
| 3,046,262 | 7/1962 | Krieble | 260/89.5 R |
| 3,259,437 | 7/1966 | Malthaner | 301/20 |

FOREIGN PATENTS OR APPLICATIONS

| | | | |
|---|---|---|---|
| 189,626 | 7/1922 | United Kingdom | 85/1 R |

*Primary Examiner*—Robert S. Ward, Jr.
*Assistant Examiner*—Reinhard J. Eisenzopf
*Attorney, Agent, or Firm*—Mack D. Cook, II

[57] ABSTRACT

In the original invention, Ser. No. 325,510, filed Jan. 22, 1973, rotatable support bolts carrying fastening nuts moving clamp elements into engagement with a rim flange are rotated to a predetermined "first stage" position to correctly align the rim on a wheel. Thereafter, the fastening nuts are rotated relative to the support bolts to provide a "second stage" position so as to fully seat the rim on the wheel without distortion or misalignment. In this invention, the support bolt, the fastening nut and the clamp element are "pre-assembled" or unitized in combination with a ring collar secured on the medial portion of the support bolt, to provide a "factory made" assembly. The assembly is made by setting a ring collar in a precise location according to predetermined functional dimensions and tolerances assuring achievement of "first-stage" positioning so as to correctly align the rim on the wheel prior to "second-stage" tightening of the rim on the wheel. The ring collar is secured either by adhesive bonding or by metallurgical techniques involving the application of heat energy.

5 Claims, 6 Drawing Figures

PATENTED JUL 29 1975 3,897,113

SHEET 1

RIM MOUNTING

CROSS-REFERENCE TO RELATED APPLICATIONS

The subject matter of the invention is a continuation-in-part of co-pending application Ser. No. 325,510, filed Jan. 22, 1973.

BACKGROUND OF THE INVENTION

The invention relates to the mounting of tire carrying rims, either single or dual, on a wheel, either front or rear, of a vehicle, such as a truck or trailer.

The subject matter of co-pending application Ser. No. 325,510, filed Jan. 22, 1973, relates to an assembly for "two-stage" mounting of single or dual rims on a wheel with extreme accuracy.

In application Ser. No. 325,510, rotatable support bolts carrying fastening nuts moving clamp elements into engagement with the rim flange are rotated to a predetermined "first-stage" position to correctly align the rim on the wheel. Thereafter, the fastening nuts are rotated relative to the support bolts to further move the clamp elements axially inwardly to provide a "second-stage" tightening of the rim on the wheel without distortion or misalignment.

In each embodiment of a two-stage assembly 20, as disclosed in application Ser. No. 325,510, the "first-stage" position of the support bolt 26 is determined by a stop means 31.

The rotatable support bolt 26 of application Ser. No. 325,510, has a cap head 30, a medial portion 40 and an axially inner portion 38. The stop means 31 is provided by a radially oriented surface 39, formed as by precision machining, between the smaller diameter axial inner portion 38 and the larger diameter medial portion 40. The axially inner portion 38 of the support bolt is inserted into a wheel bore 25 and rotated until the stop surface 39 has contacted a wheel boss surface 37.

It has now been found that a modification of the stop means for the rotatable support bolt of application Ser. No. 325,510, will decrease the cost of manufacture of the assembly by not requiring the use of precision machined support bolts, fastening nuts and clamp elements, will provide an assembly which is unitized so that the components thereof cannot be lost or misplaced by the mechanic when making a tire change, and will provide an assembly which can be made to have and maintain precise and predetermined functional dimensions and tolerances, as required for correctly aligning various types or styles of a rim flange on the wheel during "first-stage" positioning and prior to "second-stage" tightening.

SUMMARY OF THE INVENTION

The object of the invention is to provide an improved "two-stage" assembly for mounting single or dual tire carrying rims on a wheel.

It is a further object of the invention to provide an improvement for "first-stage" positioning and "second-stage" tightening of single or dual rims with accuracy so as to assure lateral alignment and minimize radial runout of the rims when mounted.

Still further, it is an object of the invention to provide a "two-stage" assembly with a rotatable support bolt having a stop means which can be made at a lower cost, which is unitized so that components thereof cannot be lost or misplaced, and which can be made to have and maintain predetermined dimensional tolerances as required for correctly aligning a specific type or style of rim flange on a wheel during "first-stage" positioning and prior to "second-stage" tightening.

These and other objects of the invention, and the advantages thereof, will be apparent in view of the Description of a Preferred Embodiment and alternative embodiments, as set forth below.

In general, an assembly for rim mounting according to the invention comprises a series or sets of support bolts, fastening nuts, clamp elements and ring collars. The wheel has a series of axially directed bores adjacent the wheel felloe for rotatably receiving the external threads on the axially inner end of a support bolt. A fastening nut is rotatably mounted on the external threads on the medial portion of the support bolt. Each fastening nut has a radially oriented flange surface for engaging a clamp element. Each clamp element has an axially directed bore for housing a support bolt and an axially directed portion for engaging the rim mounting flange. A ring collar is secured on the medial portion of the support bolt axially inwardly of the clamp element. The ring collar has an effective outer diameter greater than the inner diameter of the bore in the clamp element so as to retain the clamp element and the fastening nut on the support bolt.

The axially outer portion of a support bolt has a cap head thereon which when rotated will cause a fastening nut on the bolt threads and in contact with the cap head to engage a clamp element and move the clamp element axially toward, and into engagement with, the rim mounting flange. The ring collar provides a precisely located stop means on the medial portion of a support bolt to limit the extent of axially inward movement of the fastening nut and clamp element and thereby establish a "first-stage" position for rim mounting. By providing for "first-stage" positioning, the rim is prevented from being drawn off side or out of alignment by the first clamping elements and is therefore correctly aligned on the wheel felloe. Subsequent rotation of the fastening nut away from the cap head will move the clamp element further axially inwardly and thereby provide a "second-stage" position for rim mounting. During the "second-stage" of rim mounting, the clamp elements will be tightened so as to fully seat the rim on the wheel felloe without distortion or misalignment.

Figure 5:
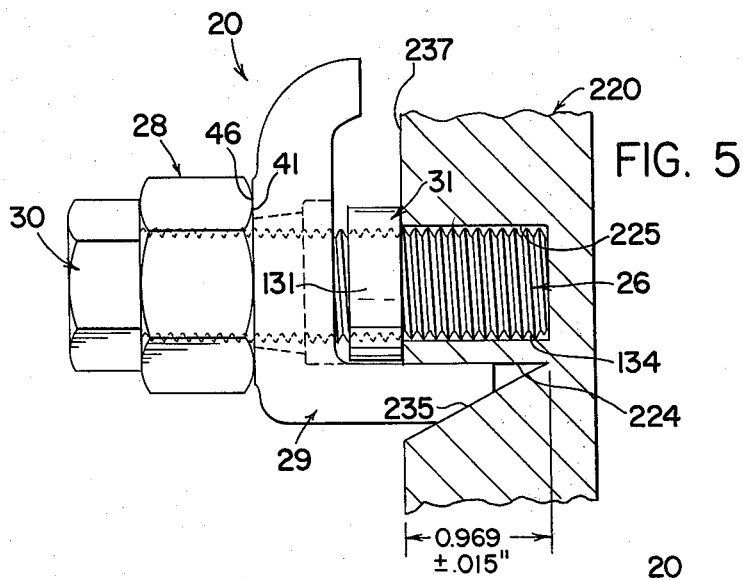
FIG. 5 is a schematic view of a functionally dimensioned gageing fixture to make the assembly as shown in FIG. 1.
Figure 6:
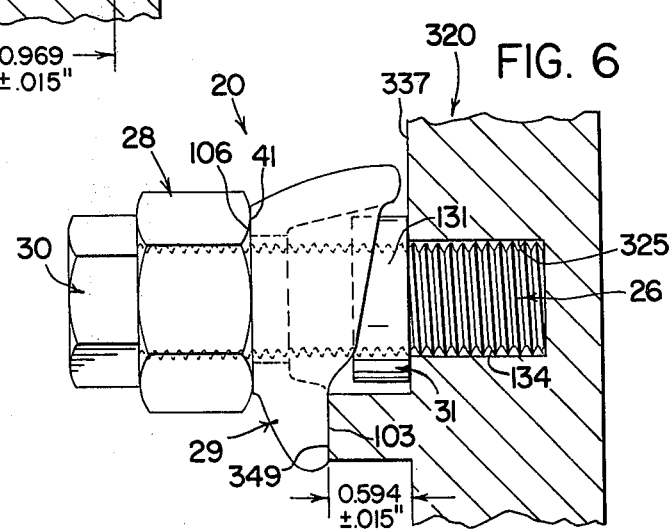
FIG. 6 is a schematic view of a functionally dimensioned gageing fixture to make the assembly as shown in FIG. 2.

The dimensions of FIGS. 5 and 6 are illustrative only, as disclosed and described in further detail below.

DETAILED DESCRIPTION OF THE INVENTION

A rim mounting according to the invention is referred to generally by the numeral 20. The rims, whether single or dual inner and outer rims, are referred to generally by the numeral 21. The spacer for dual rim mounting is referred to generally by the numeral 22. The wheel is referred to generally by the numeral 23 with the wheel felloe, felly or loadbearing surface being referred to generally by the numeral 24 and with a series of axially directed bores adjacent the wheel felloe 24 being referred to generally by the numeral 25.

The support bolt of each assembly 20 is referred to generally by the numeral 26. The fastening nut of an assembly 20 rotatably mounted on the support bolt 26 is referred to generally by the numeral 28. The axially directed portion of a clamp element of an assembly 20 for engaging a rim 21 is referred to generally by the numeral 29. The cap head of a support bolt 26 is referred to generally by the numeral 30. The ring collar on the support bolt 26 providing the stop means for "first-stage" positioning is referred to generally by the numeral 31.

Figure 1:
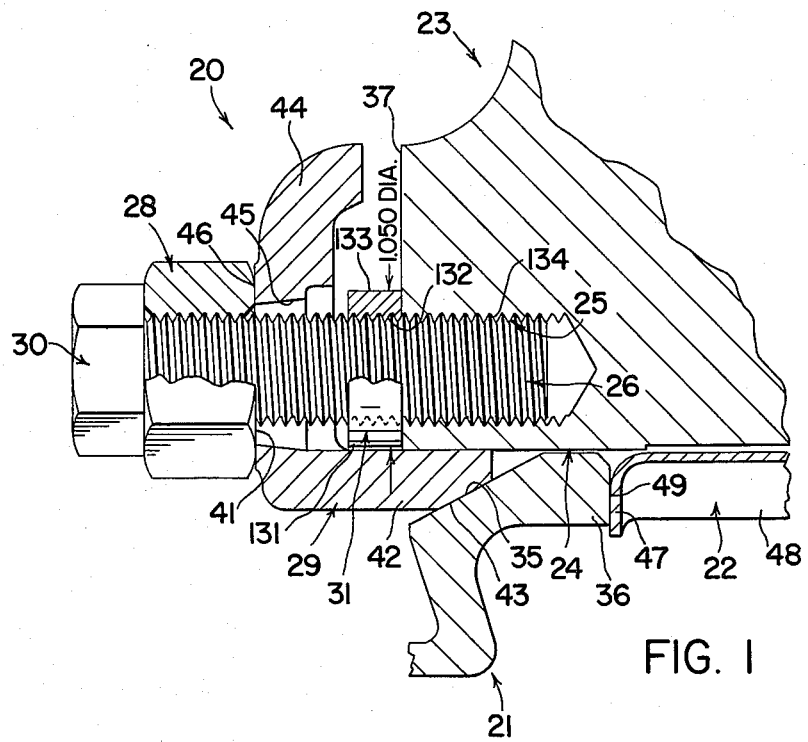
FIG. 1 is a fragmentary sectional view of a dual rim mounting according to the invention.

In FIG. 1, the assembly 20 is shown as used for the mounting of dual inner and outer rims 21 separated by a rigid spacer 22 on a wheel 23. As shown in detail in application Ser. No. 325,510, the wheel 23 has a relatively wide felly surface 24 with an inclined surface 34 at the axially inner end for mating engagement with a radially inclined surface 35 on the mounting flange 36 of an inner rim 21. The axially outer end of the felly surface 24 terminates in radially oriented boss surfaces 37.

Figure 2:
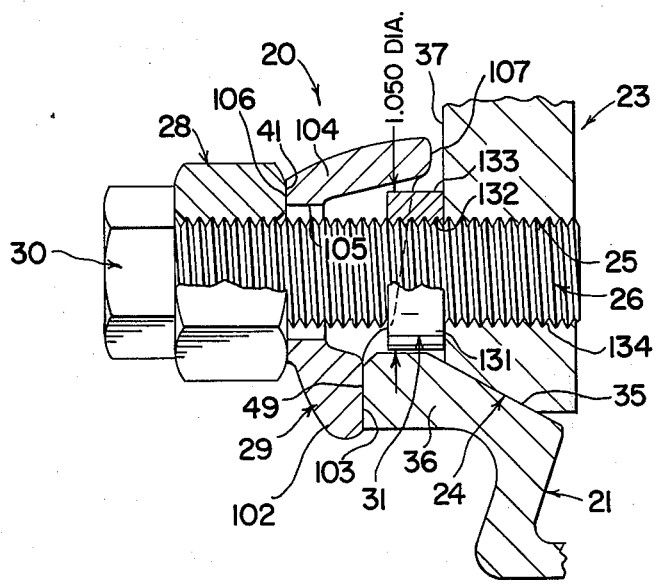
FIG. 2 is a fragmentary sectional view of a single rim mounting according to the invention.

In FIG. 2, the assembly 20 is shown as used for the mounting of a single rim 21 on the wheel 23. The felly surface 24 is inclined for mating engagement with a radially inclined surface 35 on the mounting flange 36 of the rim 21. The axially outer end of the felly surface 24 terminates in radially oriented boss surfaces 37.

In both FIGS. 1 and 2, the internally threaded bores 25 for rotatably receiving the support bolts 26 extend axially inwardly from the boss surfaces 37.

In both FIGS. 1 and 2, the fastening nut 28 has an axially inner or base portion providing a radially oriented flange surface 41 for engaging a clamp means including the clamp element 29.

In FIG. 1, the clamp element 29 is provided by the axially directed leg 42 of a conventional one-piece clamp lug slidably engaging the felly surface 24 and having an inclined surface 43 for mating engagement with a radially inclined surface 35 on the mounting flange 36 of an outer rim 21. The axially directed leg 42 intersects a radially directed leg 44 with an axially directed bore 45 housing a support bolt 26 and having an axially outer surface 46 for engagement with a fastening nut flange surface 41. The rigid spacer 22 is a conventional annular spacer or spacer ring carried on the felly surface 24. The spacer has lateral flanges or marginal portions 47 carried by a non-compressible medial portion 48. The spacer edges 47 are preferably oriented substantially vertically or perpendicular to the rotational axis of the wheel 23 for mating engagement with a radially oriented surface 49 on the mounting flange 36 of the inner and outer rims 21.

The numerals 50 through 99, are not used in this Specification. However, reference is made to the various types and styles of flanges for rims 21 and to various configurations for clamp elements 29, as described and disclosed in FIGS. 2, 3 and 4 of application Ser. No. 325,510, as being illustrative of rim mountings which could be made using the assembly 20 according to the invention of this application.

In FIG. 2, the clamp element 29 is provided by the axially directed leg 102 of a one-piece clamp lug having a radially oriented surface 103 for mating engagement with the surface 49 on the mounting flange 36 of the rim 21. The axially directed leg 102 intersects a radially directed leg 104 with an axially directed bore 105 housing a support bolt 26 and having an axially outer surface 106 for engagement with the fastening nut flange surface 41. The radially inner end of a clamp leg 104 has an axially inwardly directed portion 107 for engagement with the wheel 23.

The numerals 108 through 130, are not used in this Specification.

THE RING COLLAR

According to this invention, the stop means 31 for providing the "first-stage" position of a support bolt 26 is an annular ring collar 131 having internal threads 132 for rotatable mounting on the support bolt 26. The circumferential surface 133 of a ring collar 131 has an effective diameter, for example 1.500 inches, greater than the inner diameter of the bore (45 or 105) in the radially directed leg (44 or 104) of a clamp element 29. The ring collar surface 133 need not be uniformly circular, for example, may be polygonal or elliptical, so long as a maximum diameter thereof is greater than the inner diameter of the bore in the clamp element.

Axially inwardly of the cap head 30, the shank of the support bolt 26 may be formed with circumferentially continuous external threads 134 of a uniform diameter. The threads 134 have a diameter for mating engagement with the threads of a bore 25, the threads of a fastening nut 28 and the threads 132 of the ring collar 131.

The assembly 20 is made by first inserting the support bolt 26 into the fastening nut 28 which is rotated on the threads 134 until the fastening nut is adjacent the cap head 30. Second, the support bolt 26 is inserted through the bore (45 or 105) of a clamp element 29. Third, the support bolt 26 is inserted into the ring collar 131 which is rotated toward the clamp element 29. Fourth, the ring collar 131 is set in a precise location on the threads 134 of the support bolt 126 according to predetermined functional dimensions and tolerances of a rim flange 36 and a wheel 23, as by use of the functionally dimensioned gageing fixtures shown in FIGS. 5 and 6.

Figure 3:
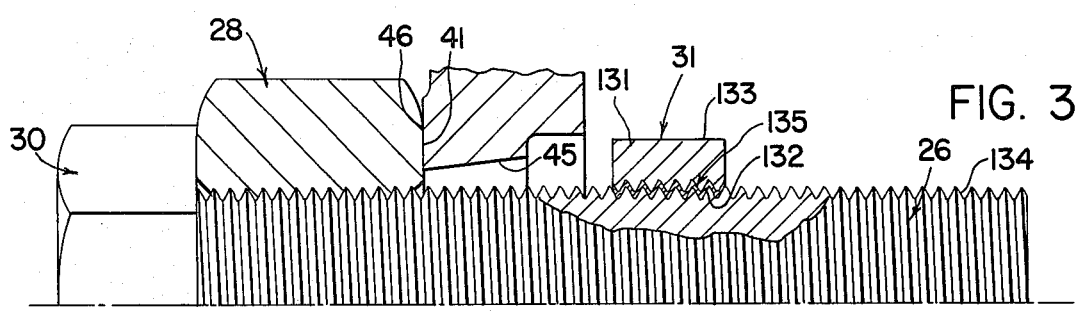
FIG. 3 is a further sectional view illustrating the securing of the ring collar on the support bolt by an adhesive bond.

Referring to FIG. 3, an adhesive bond as indicated at 135 may be used to secure the ring collar threads 132 relative to or on the support bolt threads 134. Specifically, the adhesive art has provided a class of sealant materials referred to as "anaerobic curing sealant compositions". This class of materials has an extended shelf life, remains pliable, in the presence of oxygen. However, when used as a bonding agent for two mating elements, assembled to provide a mechanical exclusion of atmospheric oxygen, the sealant will be activated to set and maintain the ring collar 131 in the precise location on the support bolt 26 during use of the assembly 20 for rim mounting. Reference is made to U.S. Pat. Nos. 3,043,820; 3,046,262; and 3,218,315, for a disclosure of compositions for anaerobic curing sealant materials which may be used in the making of an assembly 20 by adhesive bonding.

Figure 4:
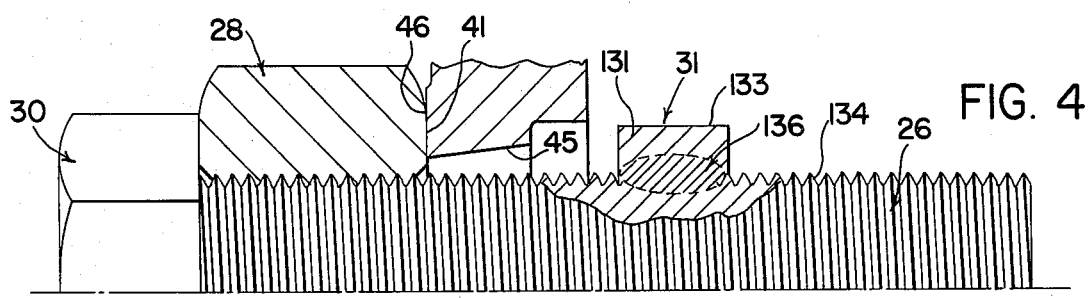
FIG. 4 is a further sectional view illustrating the securing of the ring collar on the support bolt by welding.

Referring to FIG. 4, a metallurgical technique involving the application of heat energy may be used to make a bond as indicated at 136 to secure the ring collar 131 relative to or on the support bolt threads 134. Specifically, a conventional metallurgical technique such as resistance welding may be used for the making of an assembly 20.

Referring to FIG. 5, a functionally dimensioned gageing fixture to make the assembly 20, for a dual rim mounting as shown in FIG. 1, is referred to generally by the numeral 220. The fixture 220 has a smooth bore 225, simulating the wheel bore 25, with a depth or extent defining the "first-stage" position of a support bolt 26. The fixture 220 also has intersecting and converging surfaces 224 and 235. The surface 224 simulates the wheel felly surface 24. The surface 235 simulates the radially inclined surface 35 of the mounting flange 36 of the outer rim 21 of FIG. 1. The open area defined by the intersecting surfaces 224 and 235 defines the "first-stage" position of a clamp element 29. The intersecting surfaces 224 and 235 extend from a surface 237 simulating the wheel boss surface 37. Surface 237 defines the "first-stage" setting of a ring collar 131 on a support bolt 26, used in an assembly 20 as shown in FIG. 1.

The illustrative dimension in FIG. 5 is representative of a "first-stage" positioning dimension determined by the rim flange 36 and mating clamp element 29 and wheel 23, as used in the dual rim mounting as shown in FIG. 1. The illustrative dimension, 0.969 +/−0.015 inch will decrease during second-stage mounting of dual rims 21 on a wheel 23.

Referring to FIG. 6, a functionally dimensioned gageing fixture to make the assembly 20, for a single rim mounting as shown in FIG. 2, is referred to generally by the numeral 320. The fixture 320 has a smooth bore 325, simulating the wheel bore 25, with a depth or extent defining the first-stage position of a support bolt 26. The fixture 320 also has a surface 349 simulating the radially oriented surface 49 on the mounting flange 36 of the rim 21 of FIG. 2. The surface 349 defines the first-stage position of a clamp element 29. The fixture 320 also has a surface 337 simulating the wheel boss surface 37. The surface 337 defines the first-stage setting of a ring collar 131 on a support bolt 26, used in an assembly 20 as shown in FIG. 2.

The illustrative dimension in FIG. 6 is representative of a first-stage positioning dimension determined by the rim flange 36 and mating clamp element 29 and wheel 23, as used in the single rim mounting as shown in FIG. 2. The illustrative dimension, 0.594 +/−0.015 inch will increase during second-stage mounting of a single rim 21 on a wheel 23.

In the event the assembly 20 is made using either the fixture 220 or 330, and the ring collar 131 is secured by an adhesive bond 135, the adhesive composition is applied prior to rotatable mounting of the ring collar 131 on the support bolt 26, and positioning thereof in relation to surface 237 or 337. In the event the assembly 20 uses a metallurgical bond, the assembly 20 after being made using either a fixture 220 or 330 may be completed by the application of heat energy.

What is claimed is:

1. An assembly for mounting at least one rim with a mounting flange on the felloe of a wheel, said assembly comprising a series of support bolts, fastening nuts, clamp elements, and ring collars, each support bolt having external threads of uniform diameter for rotatabley mounting a fastening nut and a ring collar, said wheel having a series of axially directed bores adjacent said wheel felloe for rotatably receiving the threads of a support bolt, each fastening nut having a radially oriented flange surface for engaging a clamp element, each clamp element having an axially directed bore for housing a support bolt and an axially directed portion for engaging said rim mounting flange, each ring collar being secured on a support bolt axially inwardly of a clamp element in a precise location according to predetermined functional dimensions and tolerances of said rim flange and said wheel and having an effective outer diameter greater than the inner diameter of said bore in said clamp element, the axially outer portion of a support bolt having a cap head thereon which when rotated will cause a fastening nut on said bolt threads to engage a clamp element and move said clamp element axially toward the rim mounting flange until a ring collar contacts said wheel, whereby, subsequent rotation of a fastening nut away from said cap head will move a clamp element to fully seat the rim on the wheel.

2. An assembly according to claim 1 wherein a ring collar is secured on a support bolt by adhesive bonding.

3. An assembly according to claim 2 wherein said adhesive is an anaerobic curing sealant composition.

4. An assembly according to claim 1 wherein a ring collar is secured on a support bolt by a metallurgical technique involving the application of heat energy.

5. An assembly according to claim 4 wherein said metallurgical technique is resistance welding.

* * * * *